(12) United States Patent
Hasegawa

(10) Patent No.: US 10,193,715 B2
(45) Date of Patent: Jan. 29, 2019

(54) TRANSMISSION APPARATUS, RECEPTION APPARATUS, AND COMMUNICATION SYSTEM

(71) Applicant: Mitsubishi Electric Corporation, Chiyoda-ku (JP)

(72) Inventor: Fumihiro Hasegawa, Tokyo (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 0 days.

(21) Appl. No.: 15/547,697

(22) PCT Filed: Feb. 23, 2016

(86) PCT No.: PCT/JP2016/055261
§ 371 (c)(1),
(2) Date: Jul. 31, 2017

(87) PCT Pub. No.: WO2016/136739
PCT Pub. Date: Sep. 1, 2016

(65) Prior Publication Data
US 2018/0034671 A1 Feb. 1, 2018

(30) Foreign Application Priority Data

Feb. 23, 2015 (JP) .................................. 2015-033242

(51) Int. Cl.
*H04L 25/03* (2006.01)
*H04B 1/10* (2006.01)
(Continued)

(52) U.S. Cl.
CPC ......... *H04L 25/03159* (2013.01); *H04B 1/10* (2013.01); *H04B 7/005* (2013.01);
(Continued)

(58) Field of Classification Search
CPC .......... H04L 25/03159; H04L 27/2636; H04L 25/03828; H04L 27/2649; H04B 1/10; H04B 7/005
See application file for complete search history.

(56) References Cited

U.S. PATENT DOCUMENTS

2005/0163261 A1* 7/2005 Nakao ................. H04B 7/0874
375/343
2007/0280365 A1* 12/2007 Seki ..................... H04L 5/0046
375/260
(Continued)

FOREIGN PATENT DOCUMENTS

JP 2010-11264 A 1/2010
JP 2010-109610 A 5/2010
(Continued)

OTHER PUBLICATIONS

International Search Report dated Mar. 29, 2016, in PCT/JP2016/055261 filed Feb. 23, 2016.
(Continued)

*Primary Examiner* — Kabir A Timory
(74) *Attorney, Agent, or Firm* — Oblon, McClelland, Maier & Neustadt, L.L.P.

(57) ABSTRACT

A transmission apparatus includes a symbol generation unit to generate N symbols, with N being an integer equal to or larger than 2, a time-frequency conversion unit to convert the N symbols to a frequency domain signal having N points, a band limiting filter to perform band limitation on the frequency domain signal having the N points to generate a frequency domain signal having $N_D$ points which is less than N, an interpolation-processing and frequency-time conversion unit to convert the frequency domain signal having $N_D$ points to a time domain signal, and a transmission unit to transmit the time domain signal at a set transmission interval.

3 Claims, 15 Drawing Sheets

(51) Int. Cl.
  *H04B 7/005* (2006.01)
  *H04J 11/00* (2006.01)
  *H04L 27/01* (2006.01)
  *H04L 1/00* (2006.01)
  *H04L 25/02* (2006.01)

(52) U.S. Cl.
  CPC ............ *H04J 11/00* (2013.01); *H04L 1/0042* (2013.01); *H04L 27/01* (2013.01); *H04J 11/0023* (2013.01); *H04L 25/022* (2013.01)

(56) References Cited

U.S. PATENT DOCUMENTS

| | | | |
|---|---|---|---|
| 2009/0323796 A1 | 12/2009 | Futatsugi et al. | |
| 2012/0214524 A1* | 8/2012 | Wajcer | H04B 1/109 455/502 |
| 2013/0265973 A1 | 10/2013 | Nakamura et al. | |
| 2013/0336276 A1 | 12/2013 | Takahashi et al. | |
| 2013/0343361 A1* | 12/2013 | Seyama | H04L 1/0026 370/336 |
| 2015/0117656 A1* | 4/2015 | Abe | H04B 3/232 381/66 |
| 2016/0013963 A1 | 1/2016 | Hasegawa et al. | |

FOREIGN PATENT DOCUMENTS

| | | |
|---|---|---|
| JP | 2012-129752 A | 7/2012 |
| JP | 2012-175335 A | 9/2012 |
| WO | WO 2014/136726 A1 | 9/2014 |
| WO | WO 2014/174754 A1 | 10/2014 |

OTHER PUBLICATIONS

Hasegawa et al., "Novel Bandwidth-Efficient SC-OFDM, Proceedings of the 2015 IEICE General Conference Tsushin 1", B-5-17, (2015), and an English Translation, 6 pages.
Benvenuto et al., "Single Carrier Modulation with Nonlinear Frequency Domain Equalization: An Idea whose Time has Come-Again", Proceedings of the IEEE, vol. 98, No. 1, (2010), pp. 69-96.
Bingham, "Multicarrier Modulation for Data Transmission: An Idea Whose Time has Come", IEEE Commun. Mag., vol. 28, No. 5, (1990), pp. 5-8 and 11-14.
Anderson et al., "Faster-Than-Nyquist Signaling", Proceedings of the IEEE, vol. 101, No. 8, (2013), 16 pages.
Jalden et al., "On the Complexity of Sphere Decoding in Digital Communications", IEEE Trans. on Signal Processing, vol. 53, No. 4, (2005), pp. 1474-1484.
Van De Beek et al., "N-Continuous OFDM", IEEE Communications Letter., vol. 13, No. 1, (2009), pp. 1-3.
Hirano et al., "TDM Based Reference Signal Multiplexing for Faster-than-Nyquist Signaling Using OFDM/OQAM", The Institute of Electronics, Information and Communication Engineers, IEICE Technical Report, RCS2014-153, (2014), p. 85.
Mazo, "Faster-Than-Nyquist Signaling", The Bell System Technical Journal, vol. 54, No. 8, (1975), pp. 1451-1462.
Rusek et al., "Constrained Capacities for Faster-Than-Nyquist Signaling", IEEE Transactions on Information Theory, vol. 55, No. 2, (2009), pp. 764-775.

* cited by examiner

FIG.18
OUTPUT OF FDE UNIT
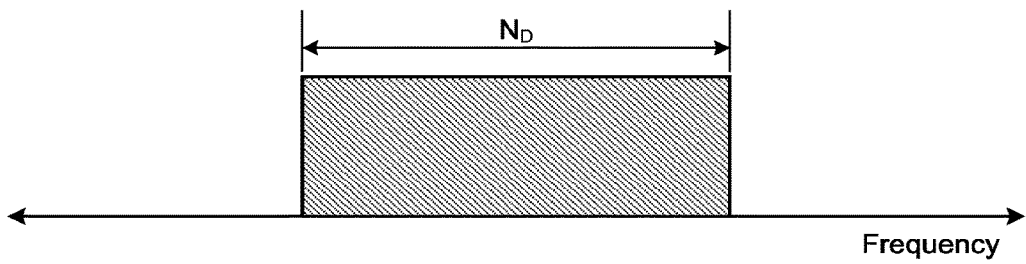
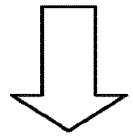
AFTER ZERO INSERTION
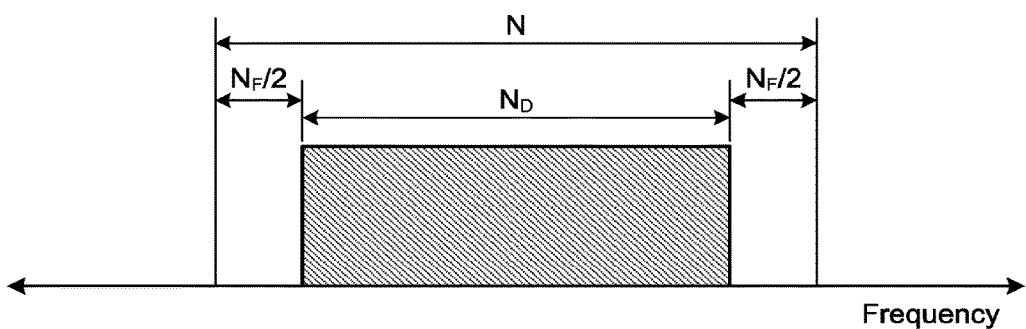
FIG.19
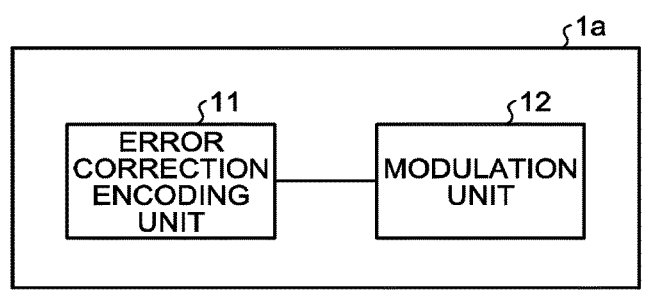

TRANSMISSION APPARATUS, RECEPTION APPARATUS, AND COMMUNICATION SYSTEM

FIELD

The present invention relates to a transmission apparatus that performs block transmission, a reception apparatus, and a communication system.

BACKGROUND

In digital communication systems, frequency selectivity and time variability in a transmission path arise because of multipath fading caused by transmission signals being reflected by buildings or the like or Doppler variations caused by the movement of terminals. In such a multipath environment, a received signal becomes a signal in which a transmission symbol and a symbol arriving after a delay time interfere with each other.

For such a transmission path having frequency selectivity, a single carrier (SC) block transmission method has recently attracted attention in order to acquire the best receiving characteristics (see, for example, Non Patent Literature 1 listed below). The single carrier block transmission method can reduce the peak power compared with an OFDM (Orthogonal Frequency Division Multiplexing) transmission method, which is multi carrier (MC) block transmission (see, for example, Non Patent Literature 2 listed below).

Meanwhile, in the digital communication systems, it has been a task to improve a signal transmission speed. Thus, for improvement of the signal transmission speed, in multi carrier block transmission, there has been proposed a Faster than Nyquist transmission technique by which transmission can be performed faster than the Nyquist rate (see, for example, Non Patent Literature 3 listed below).

CITATION LIST

Non Patent Literatures

Non Patent Literature 1: N. Benvenuto, R. Dinis, D. Falconer and S. Tomasin, "Single Carrier Modulation With Nonlinear Frequency Domain Equalization: An Idea Whose Time Has Come-Again", Proceedings of the IEEE, vol.98, No.1, January 2010, pp.69-96.

Non Patent Literature 2: J. A. C. Bingham, "Multicarrier Modulation For Data Transmission: An Idea Whose Time has Come", IEEE Commun. Mag., vol.28, No.5, May 1990, pp.5-14.

Non Patent Literature 3: J. B. Anderson, F. Rusek and V. Owall, "Faster-Than-Nyquist Signaling", Proceedings of the IEEE, vol.101, No.8, August 2013, pp.1817-1830.

SUMMARY

Technical Problem

Also in the SC block transmission method, by applying the Faster than Nyquist transmission technique, improvement of a signal transmission speed can be expected. However, in the Faster than Nyquist transmission technique, because signals are transmitted at a rate faster than the Nyquist rate, interference between symbols occurs. Therefore, demodulation needs to be performed by using the Viterbi algorithm. Accordingly, a calculation amount for demodulation increases on a reception apparatus side, and the hardware size also increases.

The present invention has been achieved in view of the above problems, and an object of the present invention is to provide a transmission apparatus that can suppress a calculation amount on a reception side and improve a transmission speed.

Solution to Problem

A transmission apparatus according to an aspect of the present invention comprises a symbol generation unit to generate N symbols, with N being an integer equal to or larger than 2, a time-frequency conversion unit to convert the N symbols to a frequency domain signal having a first bandwidth, and a band limiting filter to perform band limitation on the frequency domain signal having the first bandwidth to generate a frequency domain signal having a second bandwidth narrower than the first bandwidth. Further, the transmission apparatus comprises a frequency-time conversion unit to convert the frequency domain signal having the second bandwidth to a time domain signal and a transmission unit to transmit the time domain signal at a set transmission interval.

Advantageous Effects of Invention

According to the present invention, an effect is obtained where it is possible to improve a transmission speed while suppressing a calculation amount on a reception side.

BRIEF DESCRIPTION OF DRAWINGS

FIG. 18 is a diagram illustrating an example of zero insertion processing performed by a zero insertion unit according to the fourth embodiment.

FIG. 19 is a diagram illustrating a configuration example of a symbol generation unit to be used in a transmission apparatus that performs encoding of an error correction code.

DESCRIPTION OF EMBODIMENTS

Exemplary embodiments of a transmission apparatus, a reception apparatus, and a communication system according to the present invention will be explained below in detail with reference to the drawings. The present invention is not limited to the embodiments.

First Embodiment.

Figure 1:
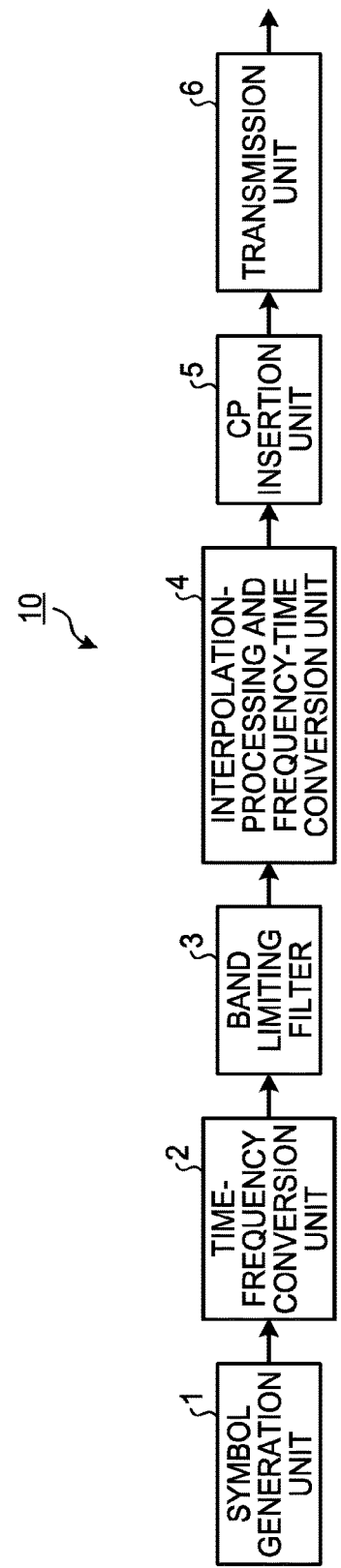
FIG. 1 is a diagram illustrating a configuration example of a transmission apparatus according to a first embodiment.

FIG. 1 is a diagram illustrating a configuration example of a transmission apparatus 10 according to a first embodiment of the present invention. As illustrated in FIG. 1, the transmission apparatus 10 according to the present embodiment includes a symbol generation unit 1 that generates a symbol, a time-frequency conversion unit 2 that converts a symbol generated by the symbol generation unit 1 from a time domain signal to a frequency domain signal having a first bandwidth, a band limiting filter 3 that performs band limitation on the frequency domain signal having the first bandwidth to generate a frequency domain signal having a second bandwidth, an interpolation-processing and frequency-time conversion unit 4 that is a frequency-time conversion unit that performs interpolation processing on the band-limited frequency domain signal and converts the signal that has undergone the interpolation processing to a time domain signal, a CP insertion unit 5 that inserts a CP (Cyclic Prefix) into the time domain signal generated by the interpolation-processing and frequency-time conversion unit 4, and a transmission unit 6 that transmits the CP-inserted time domain signal at a set transmission interval.

Figure 2:
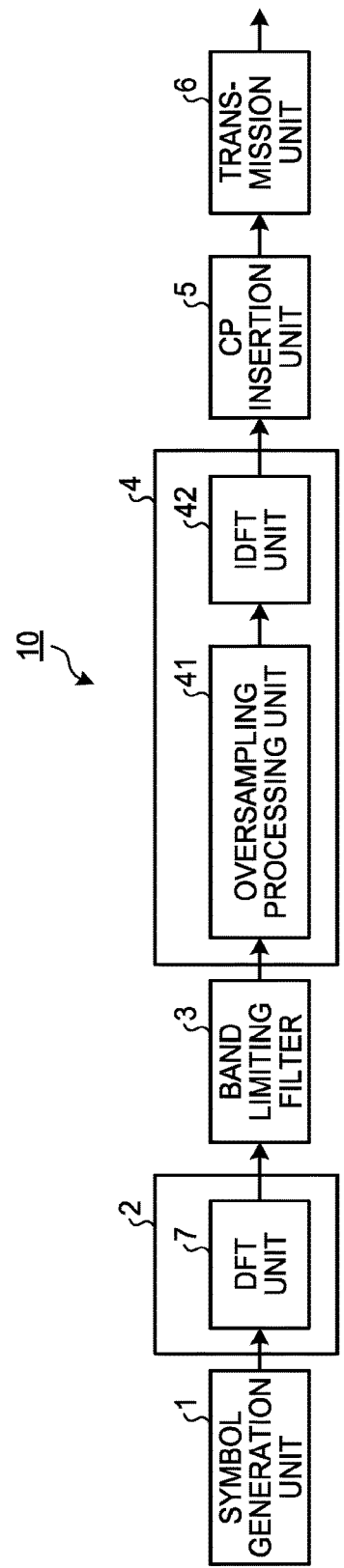
FIG. 2 is a diagram illustrating a configuration example of the transmission apparatus according to the first embodiment, including an oversampling processing unit and an IDFT unit.

The interpolation-processing and frequency-time conversion unit 4 illustrated in FIG. 1 can be realized by an oversampling processing unit that performs oversampling and an IDFT unit that performs IDFT (Inverse Discrete Fourier Transform), which is a kind of inverse Fourier transform. FIG. 2 is a diagram illustrating a configuration example of the transmission apparatus 10 according to the present embodiment, including an oversampling processing unit 41 and an IDFT unit 42. The time-frequency conversion unit 2 can be realized by a DFT (Discrete Fourier Transform) unit 7 that performs DFT being a kind of Fourier transform. In FIG. 2, parts corresponding to constituent elements in FIG. 1 are denoted by the same reference signs as those in FIG. 1. Configurations and operations of the present embodiment will be described below based on the configuration example illustrated in FIG. 2.

An FFT unit that performs FFT (Fast Discrete Fourier Transform) and an IFFT unit that performs IFFT (Inverse Fast Discrete Fourier Transform) can be used instead of the DFT unit 7 and the IDFT unit 42 in FIG. 2, respectively.

The transmission apparatus 10 according to the present embodiment transmits a signal by applying the Faster than Nyquist transmission technique to SC block transmission. A transmission technique according to a general Nyquist's first criterion and the Faster than Nyquist transmission technique will be described here.

First, the transmission technique according to the general Nyquist's first criterion will be described. When it is assumed that a transmission interval of transmission signals is Ts, a symbol time, that is, a symbol period is assumed to be $T_{symbol}$. After performing matched filtering processing on a receiver side, band limitation is performed so that a Nyquist pulse intersecting with 0 at the interval Ts is generated. When the transmission apparatus transmits a pulse, the pulse width spreads toward the bottom at the front and back of the pulse. However, if the next pulse is transmitted after the spread of the pulse width attenuates sufficiently, the transmission interval becomes long. The Nyquist pulse is a pulse intersecting with 0 at regular intervals. By transmitting pulses such that the Nyquist pulse can be acquired after the matched filtering processing on the receiver side at a timing when Nyquist pulses transmitted before and after the Nyquist pulse become 0, transmission can be performed without being affected by the previous and subsequent Nyquist pulses, that is, the symbols transmitted previously and subsequently.

Figure 3:
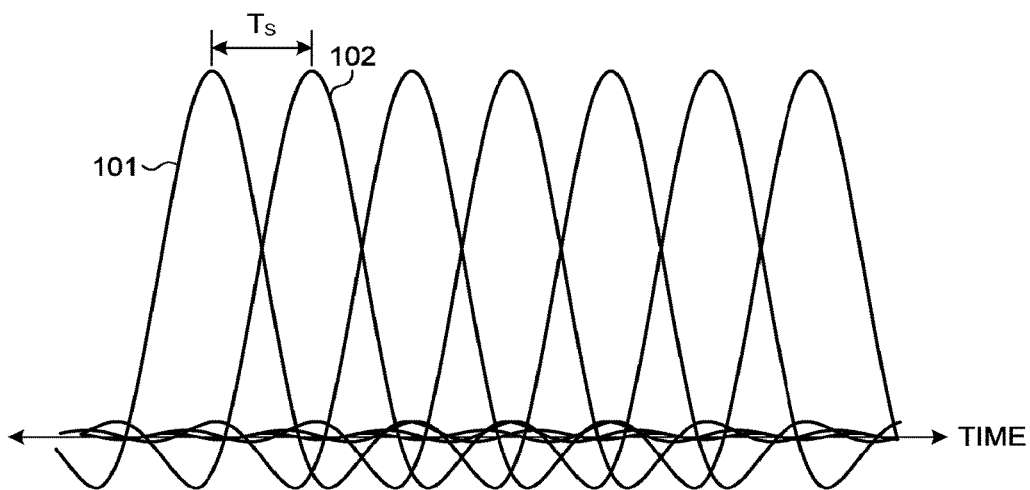
FIG. 3 is an explanatory diagram of a Nyquist pulse acquired after performing matched filtering processing on a reception side.

FIG. 3 is an explanatory diagram of the Nyquist pulse acquired by performing the matched filtering processing on the receiver side. For example, a peak of a second pulse 102 that transmits a second symbol appears, at a timing when a first pulse 101 that transmits the first symbol is around 0 by the matched filtering processing on the receiver side. Thus, interference between pulses does not occur.

In transmission using the general Nyquist pulse, the transmission interval Ts of the Nyquist pulse illustrated in FIG. 3 is matched with one symbol time of $T_{symbol}$. That is, one Nyquist pulse in FIG. 3 is matched with one symbol. Accordingly, interference between symbols can be suppressed.

Figure 4:
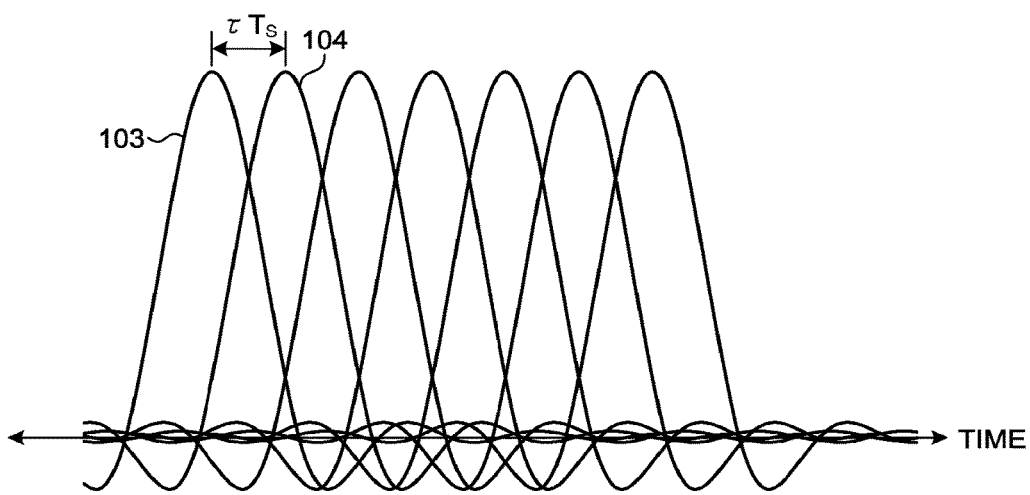
FIG. 4 is an explanatory diagram of a Faster than Nyquist transmission technique.

On the other hand, in the Faster than Nyquist transmission technique, Nyquist pulses intersecting with 0 at the interval Ts are transmitted at a shorter interval than Ts. Further, one pulse is matched with one symbol. FIG. 4 is a diagram illustrating an example of a transmission interval of pulses in the Faster than Nyquist transmission. In FIG. 4, a first pulse 103 and a second pulse 104 respectively have the same shape as the first pulse 101 and the second pulse 102 in FIG. 3; however, the interval between the first pulse 103 and the second pulse 104 in FIG. 4 is shorter than the interval between the first pulse 101 and the second pulse 102. That is, when it is assumed that the interval between the first pulse 103 and the second pulse 104 is τTs, τ<1 (for example, see Non Patent Literature 3).

In FIG. 3, respective seven pulses are described independently for explanation. However, an actual transmission signal is obtained by combining seven pulses illustrated in FIG. 3. Similarly in the example illustrated in FIG. 4, an actual transmission signal is obtained by combining seven pulses illustrated in FIG. 4.

As illustrated in FIG. 4, when the Faster than Nyquist transmission technique is used, data can be transmitted at a faster interval than the example illustrated in FIG. 3, thereby enabling high-speed transmission. However, because the pulse interval is shorter than Ts, interference between symbols occurs. Therefore, it is required to perform demodulation of an FtN signal by using trellis demodulation method such as the Viterbi algorithm on a reception side, and a calculation amount is increased in response to the number of multi-paths in a transmission path and the multi-level number of a modulation signal. On the other hand, according to the present embodiment, the number of pieces of data, that is, the number of symbols of the time domain signal generated by the symbol generation unit 1 is increased than the number of pieces of data corresponding to a set limited band. The time domain signal having the increased number of pieces of data is converted to a frequency domain signal, and band limitation is applied to the frequency domain signal. Thus, large-capacity transmission in a narrow band is performed.

Figure 5:
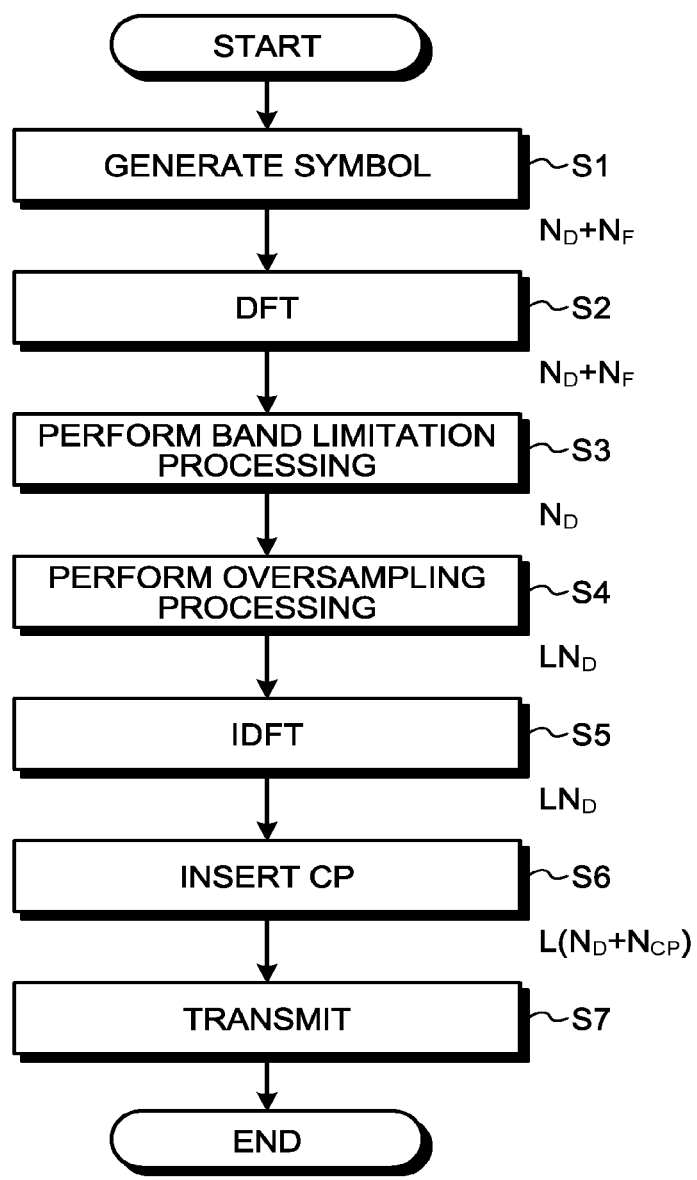
FIG. 5 is a flowchart illustrating an example of a transmission processing procedure of the transmission apparatus according to the first embodiment.

Operations of the transmission apparatus 10 according to the present embodiment will be described. FIG. 5 is a flowchart illustrating an example of a transmission processing procedure of the transmission apparatus 10 according to the present embodiment. Characters such as $N_D+N_F$ described at the bottom right of each step in FIG. 5 indicate the number of symbols per one SC block, that is, the number of pieces of data per one SC block after execution of each step. As illustrated in FIG. 5, the symbol generation unit 1 first generates a symbol to be transmitted based on information to be transmitted (Step S1). Specifically, the symbol generation unit 1 generates and outputs a symbol such as a PSK (Phase Shift Keying) symbol or a QAM (Quadrature Amplitude Modulation) symbol. The symbol generated by the symbol generation unit 1 is not limited to the PSK symbol or the QAM symbol, and can be any symbol. In the present embodiment, it is assumed that the number of symbols to be generated per one SC block in the symbol generation unit 1 is $N=N_D+N_F$. N is an integer equal to or larger than 2. That is, N symbols are included in one SC block. The SC block is a transmission block in SC block transmission.

$N_D$ will be described here. It is assumed that a transmission interval in the transmission unit 6 is Ts. While N frequency domain signals decrease to $N_D$ frequency domain signals due to band limitation, the value of $N_F$ is determined by the demodulation performance on the reception side, because interference between symbols occurs.

In the present embodiment, as described above, when the number of symbols in one block is $N_D$, the symbol generation unit 1 generates N symbols which is more than $N_D$. $N_F$ indicates a difference between N and $N_D$, and is the number of pieces of data to be erased by the band limitation processing described below.

The DFT unit 7 performs N-point DFT processing on the symbol generated by the symbol generation unit 1 (Step S2). Accordingly, the DFT unit 7 generates a frequency domain signal including N-point data. When it is assumed that d is an input vector of N×1 representing the symbol generated by the symbol generation unit 1, s is an output vector of N×1 representing a result of DFT, and W is N×N DFT matrix, the N-point DFT processing can be represented by the following equation (1).

[Equation 1]

$$s = wd \quad (1)$$

The (m, n)th component in the DFT matrix W can be represented by the following equation (2).

[Equation 2]

$$[W]_{m,n} = \frac{1}{\sqrt{N}} e^{\frac{j2\pi mn}{N}} \quad (2)$$

When it is assumed that t is an output of IDFT and u is an input value of IDFT, the N-point IDFT can be represented by the following equation (3).
$W^H$ indicates a Hermitian transpose matrix of W.

[Equation 3]

$$t = W^H u \quad (3)$$

The band limiting filter 3 performs band limitation processing on the frequency domain signal after the N-point DFT processing (Step S3). The object of the band limiting filter 3 is to insert N pieces of data into $N_D$ ($N_D$<N) points. It is assumed that the number of pieces of data in the frequency domain signal after the band limitation processing is $N_D$. As the band limiting filter 3, for example, a root raised cosine filter is used.

Figure 6:
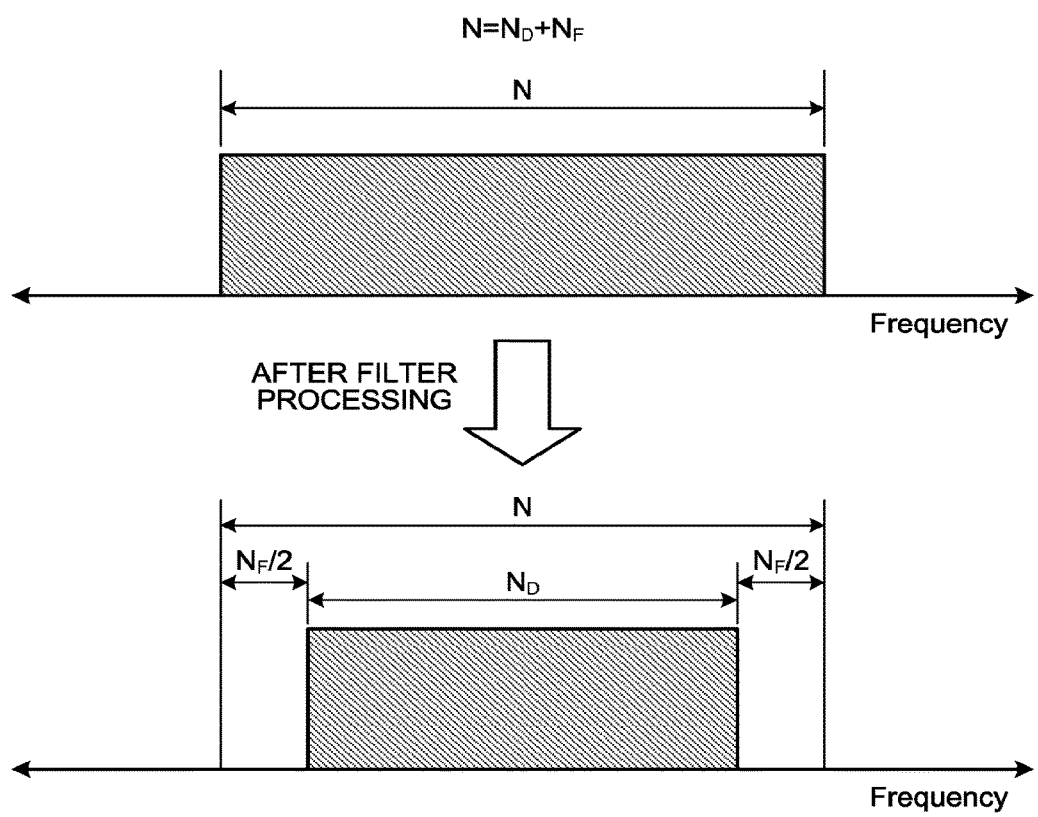
FIG. 6 is a diagram illustrating band limitation processing in a band limiting filter according to the first embodiment.

FIG. 6 is a diagram illustrating the band limitation processing in the band limiting filter 3 according to the present embodiment. An upper diagram of FIG. 6 illustrates a frequency range of the frequency domain signal having N-point data output from the DFT unit 7, that is, a frequency range of the N-point frequency domain signal. In the upper diagram and a lower diagram of FIG. 6, a horizontal axis represents frequency, and a state in which N-point data output from the DFT unit 7 is arranged so that the frequency increases toward both right and left sides is illustrated, the center of the horizontal axis being designated as 0. In the upper diagram of FIG. 6, the frequency range corresponding to the N-point data is indicated by hatching. Note that, N-point data may be present discretely within the hatched range. The hatched range conceptually indicates an existence domain on the frequency axis of the data, and the length of a hatched rectangle in a direction of a longitudinal axis does not indicate the values of pieces of data.

The lower diagram of FIG. 6 illustrates a frequency range of a signal after the band limitation processing by the band limiting filter 3. As illustrated in the lower diagram of FIG. 6, each of both ends of the N-point data is erased by $N_F/2$ by the band limitation processing, and the data after the band limitation processing becomes $N_D$ points. When it is assumed that a first bandwidth corresponding to the N-point data is B, a second bandwidth being a bandwidth after the band limitation processing becomes $B \times N_D/N$. That is, the band limiting filter 3 limits the band width of the frequency domain signal from the first bandwidth to the second bandwidth. In the example illustrated in FIG. 6, because the both ends of the band, that is, higher sides of the frequency are erased, the band limiting filter 3 is a kind of a low-pass filter. In the lower diagram of FIG. 6, as in the upper diagram of FIG. 6, $N_D$-point data is actually discretely present within the hatched range. Further, the length of the hatched rectangle in the direction of the longitudinal axis in the lower diagram of FIG. 6 does not indicate the values of pieces of data. In FIG. 6, it is simply described that the data is erased at both ends. However, when a root raised cosine filter or a Raised cosine filter is used, the value of the $N_D$-point data after the filter processing in the lower diagram of FIG. 6 has a shape in which the value gradually decreases as approaching towards the ends, that is, as the frequency increases.

In the above description, an example in which $N_F$ is an even number is described; however, $N_F$ can be an odd number. When $N_F$ is an odd number, ($N_F$+1)/2 points at one end of the frequency range of the N-point frequency domain signal are erased, and then ($N_F$−1)/2 points at the other end are erased. Further, even when $N_F$ is an even number, the number of points to be erased need not be symmetrical. By the band limitation processing described above, the number of points of data becomes $N_D$ points. However, information of N symbols is included in the $N_D$-point frequency domain signal.

Returning to the explanation of FIG. 5, the oversampling processing unit 41 performs oversampling processing on the data that has undergone the band limitation processing (Step S4). In the present embodiment, it is assumed that an oversampling rate is L. The oversampling processing of the present embodiment is to increase the sampling rate, that is, reduce the sampling intervals. When the oversampling rate is L, oversampling is performed such that the sampling rate of the output becomes L times the sampling rate of the input. The oversampling rate is a value that indicates how many times the sampling rate after the oversampling is with respect to the sampling rate of the input. As the oversampling processing, for example, a method such as zero insertion can be used. The oversampling processing may not be performed. That is, L can be 1. Further, L need not be an integer, and can be a real number. For example, when $N_D=6$, it can be set that $L=1.5$, and $N_D \times L=9$.

Figure 7:
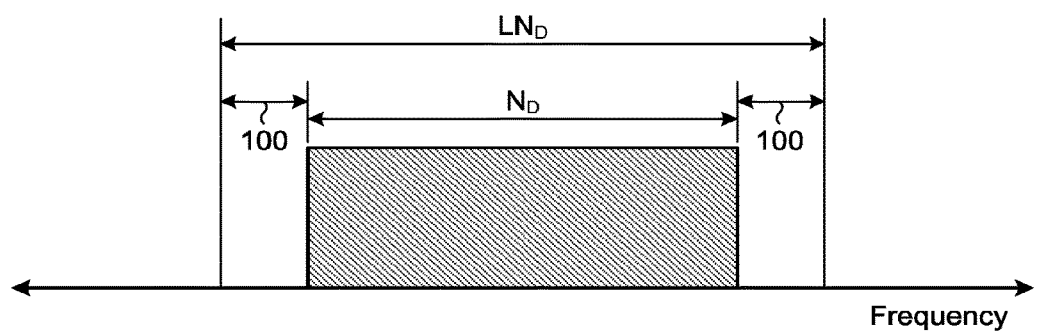
FIG. 7 is a diagram illustrating an example of zero insertion processing according to the first embodiment.

FIG. 7 is a diagram illustrating an example of zero insertion processing according to the present embodiment. FIG. 7 illustrates zero insertion processing, being an example of the oversampling processing. As illustrated in FIG. 7, the oversampling processing unit 41 inserts 0 to zero insertion regions 100 on opposite sides of the $N_D$-point data that has undergone the band limitation processing, so that the oversampled data becomes $LN_D$ points.

For example, when L=1, the processing of inserting 0 into the zero insertion regions 100 is not actually performed, and the data remains to be the $N_D$-point data after performing the oversampling processing. When L=2, the oversampling processing unit 41 inserts 0 of $N_D/2$ points into the zero insertion regions 100, to generate $LN_D$-point data in total. The number of zeros to be inserted need not be symmetrical.

Figure 8:
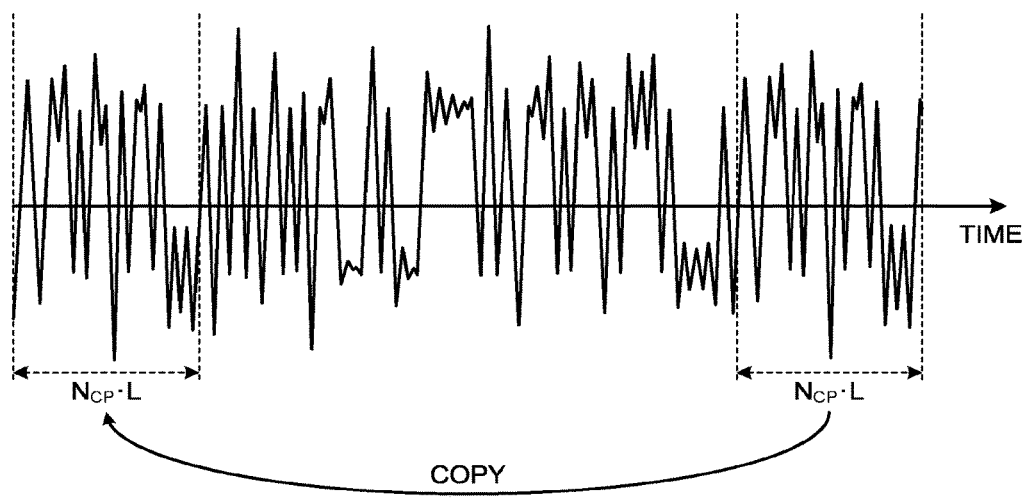
FIG. 8 is a diagram illustrating an example of CP insertion processing according to the first embodiment.

Returning to the description in FIG. 5, the IDFT unit 42 performs $LN_D$-point IDFT on the oversampled data, which is a frequency domain signal (Step S5). Accordingly, the frequency domain signal that has undergone the oversampling processing is converted to a time domain signal. The $LN_D$-point IDFT can be represented as the one in which N in the above-described equations (2) and (3) is replaced by $LN_D$. The CP insertion unit 5 then performs the CP insertion processing on the time domain signal to be output from the IDFT unit 42 (Step S6). FIG. 8 is a diagram illustrating an example of the CP insertion processing according to the present embodiment. In the example illustrated in FIG. 8, the CP insertion unit 5 copies $N_{CP} \times L$ pieces of data at the end of the time domain signal output from the IDFT unit 42, and arranges the copied $N_{CP} \times L$ pieces of data in front of the head of the time domain signal output from the IDFT unit 42. Therefore, the number of pieces of data per one SC block after the CP insertion processing becomes $L(N_D+N_{CP})$. The CP insertion is added as a measure against multipath fading, and in an environment in which there is no problem of multipath fading, $N_{CP} \times L=0$ can be set. That is, CP insertion need not be performed. Generally, because $N_{CP} \times L$ is set to be an integer, $N_{CP}$ and L can be real numbers so long as $N_{CP} \times L$ becomes an integer.

Lastly, the transmission unit 6 transmits the time domain signal that has undergone the CP insertion processing at the transmission interval of Ts (Step S7). The number of pieces of data, that is, the number of symbols transmitted per one SC block is $L(N_D+N_{CP})$ Meanwhile, in the present embodiment, the symbol generation unit 1 generates N pieces of data per one block. Therefore, information of N symbols is included in the $L(N_D+N_{CP})$ pieces of data. On the other hand, when the symbol generation unit 1 generates $N_D$ symbols per one SC block, information of only the $N_D$ symbols per one SC block is included. Therefore, in the present embodiment, the transmission apparatus 10 can transmit information $N/N_D$ times as compared with a case in which the symbol generation unit 1 generates $N_D$ symbols per one SC block. That is, the number of symbols larger than those corresponding to the preset band can be transmitted in the preset band. In the present embodiment, it is assumed that Ts is an interval, taking the oversampling rate into consideration.

Figure 9:
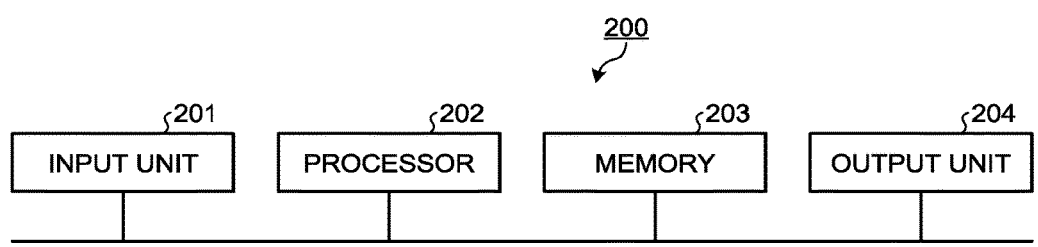
FIG. 9 is a diagram illustrating a configuration example of a control circuit according to the first embodiment.

All the constituent elements of the transmission apparatus 10 illustrated in FIG. 2 can be realized by hardware. The symbol generation unit 1 is a modem or a modulator. The DFT unit 7 and the IDFT unit 42 are electronic circuits using, for example, a flip-flop circuit or a shift register. The band limiting filter 3 is a filter circuit. The transmission unit 6 is a transmitter. The oversampling processing unit 41 can be realized as a zero insertion circuit, and the CP insertion unit 5 can be realized as a CP insertion circuit. However, a part of the constituent elements illustrated in FIG. 2 can be configured by software. When there is a constituent element configured by software among the constituent elements illustrated in FIG. 2, the constituent element configured by software is realized, for example, by control circuit 200 illustrated in FIG. 9. As illustrated in FIG. 9, the control circuit 200 includes an input unit 201 being a reception unit that receives data input from outside, a processor 202, a memory 203, and an output unit 204 being a transmission unit that transmits data to outside. The input unit 201 is an interface circuit that receives data input from outside of the control circuit 200 and provides the received data to the processor 202. The output unit 204 is an interface circuit that transmits data from the processor 202 or the memory 203 to outside of the control circuit 200. When the constituent elements illustrated in FIG. 2 are realized by the control circuit 200 illustrated in FIG. 9, the processor 202 reads programs corresponding to the constituent elements of the transmission apparatus 10, which are stored in the memory 203, and executes the programs, thereby realizing the constituent elements illustrated in FIG. 2. The memory 203 is also used as a temporary memory for each processing performed by the processor 202.

As described above, according to the present embodiment, the symbol generation unit 1 generates symbols in the number larger than the number of pieces of data in one SC block defined by the band limiting width as a time domain signal for one SC block. The DFT unit 7 converts the time domain signal to a frequency domain signal, and the band limiting filter 3 performs band limitation processing on the frequency domain signal. The IDFT unit 42 converts the signal that has undergone the band limitation processing to a time domain signal, and the transmission unit 6 transmits the time domain signal converted by the IDFT unit 42 at the transmission interval Ts.

In other words, the symbol generation unit 1 generates N symbols as symbols for one SC block as a time domain signal, and the DFT unit 7 converts the time domain signal to an N-point frequency domain signal. The band limiting filter 3 reduces the N-point frequency domain signal to an $N_D$-point frequency domain signal smaller than N. The IDFT unit 42 converts the band-limited signal to a time domain signal, and the transmission unit 6 transmits the time domain signal converted by the IDFT unit 42 at the transmission interval Ts. Accordingly, in the present embodiment, N ($N > N_D$) symbols, which is larger than that of the case where the number of symbols transmitted per one SC block is $N_D$, can be transmitted. Accordingly, high-speed transmission can be realized with a narrow bandwidth.

Second Embodiment.

Figure 10:
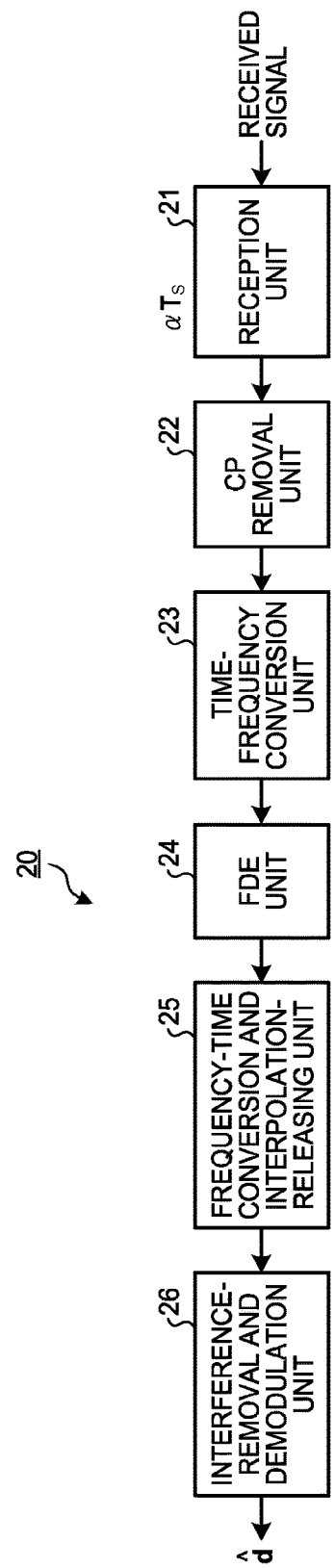
FIG. 10 is a diagram illustrating a configuration example of a reception apparatus according to a second embodiment.

FIG. 10 is a diagram illustrating a configuration example of a reception apparatus 20 according to a second embodiment of the present invention. The reception apparatus 20 according to the present embodiment receives a transmission signal transmitted from the transmission apparatus 10 according to the first embodiment. As illustrated in FIG. 10, the reception apparatus 20 according to the present embodiment includes a reception unit 21 being a receiver that receives a signal and performs sampling of the received signal, a CP removal unit 22 that removes a CP from the sampled received signal, a time-frequency conversion unit 23 that converts the received signal from which a CP has been removed to a frequency domain signal, an FDE unit 24 being an equalization processing unit that performs frequency domain equalization (FDE) based on the frequency domain signal, a frequency-time conversion and interpolation-releasing unit 25 being a frequency-time conversion unit that converts the signal that has undergone the filter processing to a time domain signal and releases interpolation, and an interference-removal and demodulation unit 26 that performs interference removal processing of removing an interference component from the signal that has undergone the processing performed by the frequency-time conversion and interpolation-releasing unit 25, the interference-removal and demodulation unit 26 being a demodulation unit that performs demodulation.

Figure 11:
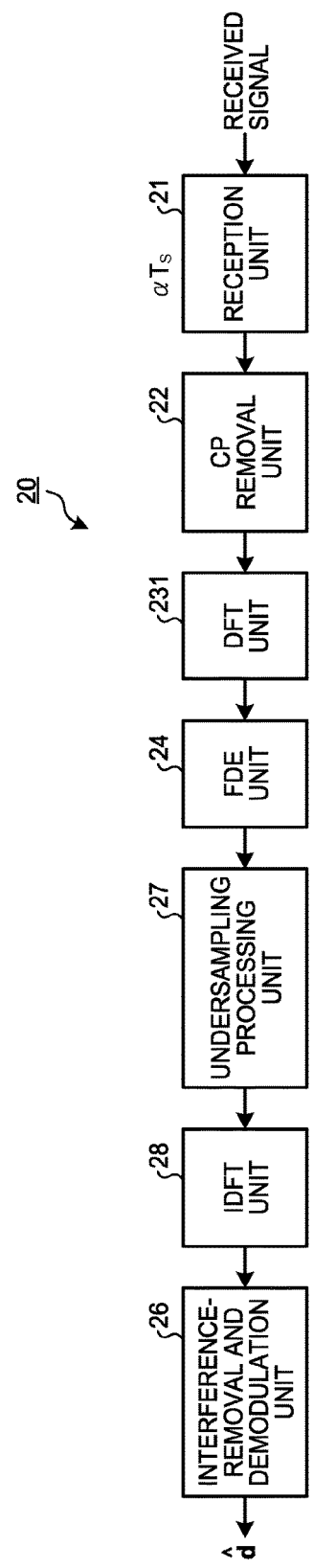
FIG. 11 is a diagram illustrating a configuration example of the reception apparatus according to the second embodiment, when including a DFT unit and the IDFT unit.

The time-frequency conversion unit 23 in FIG. 10 can be realized by a DFT unit, and the frequency-time conversion and interpolation-releasing unit 25 can be realized by an undersampling processing unit and an IDFT unit. FIG. 11 is a diagram illustrating a configuration example of the reception apparatus according to the present embodiment, when including a DFT unit and an IDFT unit. In the configuration example illustrated in FIG. 11, the time-frequency conversion unit 23 in FIG. 10 is realized by a DFT unit 231, and the frequency-time conversion and interpolation-releasing unit 25 in FIG. 10 is realized by an undersampling processing unit 27 and an IDFT unit 28. In FIG. 11, parts corresponding to constituent elements in FIG. 10 are denoted by like reference signs as those in FIG. 10. Configurations and operations of the present embodiment are described below based on the configuration example illustrated in FIG. 11.

All the constituent elements illustrated in FIG. 11 can be realized by hardware. The reception unit 21 is a receiver, the CP removal unit 22 is a CP removal circuit, the IDFT unit 28 is an IDFT circuit, the DFT unit 231 is a DFT circuit, and the undersampling processing unit 27 is an undersampling circuit. The interference-removal and demodulation unit 26 is a demodulator. However, in the constituent elements illustrated in FIG. 11, a part thereof can be realized by software. When there is a constituent element in FIG. 11, which is realized by software, the constituent element realized by software is realized by the control circuit 200 illustrated in FIG. 9, for example. When the constituent element illustrated in FIG. 11 is realized by the control circuit 200 illustrated in FIG. 9, it is realized by the processor 202 that reads and executes a program corresponding to each constituent element of the control circuit 200 stored in the memory 203. The memory 203 is also used as a temporary memory for each processing performed by the processor 202.

Figure 12:
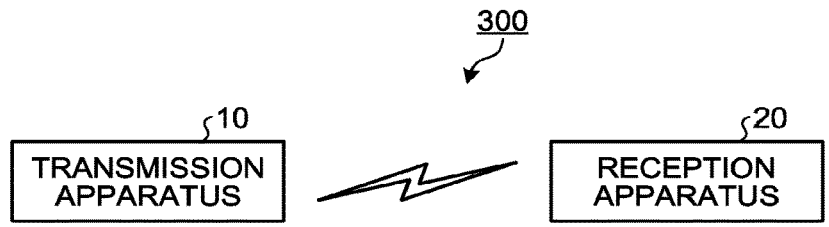
FIG. 12 is a diagram illustrating a communication system configured by the transmission apparatus according to the first embodiment and the reception apparatus according to the second embodiment.

FIG. 12 is a diagram illustrating a communication system 300 configured by the transmission apparatus 10 according to the first embodiment and the reception apparatus 20 according to the present embodiment. As described above, the reception apparatus 20 receives a signal transmitted from the transmission apparatus 10 according to the first embodiment.

The reception unit 21 performs sampling of the received signal at a $\alpha$Ts sampling interval. Ts is a transmission interval in the transmission apparatus 10 described in the first embodiment. $\alpha$ is a number decided by a ratio between the number of points in data before and after the band limitation processing in the transmission apparatus 10, and specifically $\alpha=N_D/N$. Accordingly, $\alpha$Ts is a value obtained by multiplying the transmission interval Ts in the transmission apparatus 10 by a value, obtained by dividing the bandwidth after the band limitation by the band limiting filter 3 in the transmission apparatus 10 by the bandwidth before the band limitation. When the received signal is sampled at the $\alpha$Ts sampling interval, the number of samples, that is, the number of points per one SC block becomes $L(N_D+N_{CP})/\alpha=L(N+N_{CP}/\alpha)$.

The CP removal unit 22 performs CP removal processing of removing data corresponding to the CP from the received signal sampled by the reception unit 21. In the present embodiment, the data corresponding to the CP is $LN_{CP}/\alpha$ pieces of data. As illustrated in FIG. 8, when the CP is inserted at the head by the transmission apparatus 10, the CP removal unit 22 erases $LN_{CP}/\alpha$ pieces of data at the head of the SC block. When $LN_{CP}/\alpha$ is not an integer, round-out processing and round-down processing can be performed so that $LN_{CP}/\alpha$ becomes an integer. The number of pieces of data of one SC block that has undergone the CP removal processing becomes LN. It is assumed that a boundary between the SC blocks in the received signal can be detected by the reception unit 21, and information indicating the boundary between the SC blocks is notified from the reception unit 21 to the CP removal unit 22.

The DFT unit 231 converts the received signal that has undergone the CP removal processing by the CP removal unit 22 to a frequency domain signal by LN-point DFT. The FDE unit 24 performs frequency domain equalization processing on the frequency domain signal output from the DFT unit 231. The frequency domain equalization processing is used for distortion correction in the frequency domain. Any method such as FDE of the minimum mean squared error (MMSE) criterion can be used. However, for example, a method described in Non Patent Literature 1 can be used. In the FDE, a channel response is obtained in a process of distortion correction in the frequency domain.

The undersampling processing unit 27 performs inverse processing to the oversampling processing performed by the oversampling processing unit 41 of the transmission apparatus 10. When the oversampling is performed by zero insertion, the undersampling processing unit 27 erases data in the domain into which zero is inserted by the transmission apparatus 10. At this time, the transmission apparatus 10 generates $LN_D$ pieces of data in total by inserting zero into $N_D$ pieces of data. However, because sampling is performed at the sampling interval $\alpha$Ts, $LN_D$ pieces of data on the transmission side correspond to LN pieces of data in the reception apparatus 20. Therefore, the number of pieces of data to be erased is a value corresponding to the ratio. That is, the undersampling processing unit 27 deletes zero being $N/N_D$ times the number of zeros inserted by the transmission apparatus 10. Accordingly, the number of pieces of data processed by the undersampling processing unit 27 becomes N.

The IDFT unit 28 converts the data output from the undersampling processing unit 27 to an N-point time domain signal by N-point IDFT. The interference-removal and demodulation unit 26 uses the N-point time domain signal output from the IDFT unit 28 to perform interference removal and demodulation. Specifically, the IDFT unit 28 performs the processing described below. When it is assumed that a kth data of the N-point time domain signal output from the IDFT unit 28 is $x_k$, $w_{k,m}$ is a filter coefficient, and the kth symbol transmitted by the transmission apparatus 10 is $d_k$, $x_k$ can be represented by a model indicated by the following equation (5). The filter coefficient $w_{k,m}$ can be obtained based on a filter transfer function of the band limiting filter 3 in the transmission processing, a channel response obtained by the FDE, and the like. The filter coefficient $w_{k,m}$ is decided by, for example, the following equation (4). In the equation (5), a model having no thermal noise is used. A description is made below based on a model having no thermal noise. However, even in an environment including thermal noise, an interference component can be removed by applying an interference removal method described below. X is a matrix of $N \times N_D$. G indicates from the first row to the $N/2-N_F/2$nd row of a matrix $W_N$, and H indicates from the $N/2+N_F/2+1$th row to the Nth row of the matrix $W_N$. $O_N$–NF is a column vector composed of $(N-N_F) \times 1$ zeros. Further, K is a N×N diagonal matrix and indicates an FDE coefficient.

[Equation 4]

$$y = W_N^K K \begin{bmatrix} G \\ O_{N-N_F} \\ H \end{bmatrix} d \quad (4)$$

$$\underbrace{\phantom{W_N^K K \begin{bmatrix} G \\ O_{N-N_F} \\ H \end{bmatrix}}}_{X}$$

$W_{k,m} = [X]_{k,m}$

[Equation 5]

$$x_k = d_k w_{k,k} + \sum_{m=0, m \ne k}^{N-1} d_m w_{k,m} \quad (5)$$

The N-point time domain signal output from the IDFT unit 28 is abbreviated below as IDFT output signal. In the above equation (5), the first term on the right-hand side indicates a component contributing to the kth data of the IDFT output signal of the kth symbol transmitted by the transmission apparatus 10, and the second term on the right-handside indicates a component contributing to the kth data of the IDFT output signal of the mth symbol transmitted by the transmission apparatus 10. That is, the first term on the right-hand side is a desired signal component, and the second term on the right-hand side described in the following equation (6) becomes the interference component to the desired signal component.

[Equation 6]

$$\Sigma_{m=0,m \ne k}^{N-1} d_m w_{k,m} \quad (6)$$

If the interference component is small, as described in the following equation (7), $x_k$ can be used as an estimated value $\hat{d}_k$ of $d_k$. That is, the above equation (5) is calculated, and if the calculated value is equal to or lower than a threshold, $x_k$ can be used as an estimated value of $d_k$ by the equation (7). That is, the interference-removal and demodulation unit 26 need not perform the removal processing of the interference component, and $x_k$ is designated as a demodulation result of $d_k$.

[Equation 7]

$$\hat{d}_k = x_k / w_{k,k} \quad (7)$$

Meanwhile, the signal transmitted from the transmission apparatus 10 includes so-called folding noise, that is, an aliasing component caused by reduction of the frequency component by the band limiting filter 3 In the Faster than Nyquist transmission technique described in Non Patent Literature 3, because there is interference of symbols previous and subsequent to a symbol in the time domain, demodulation needs to be performed by using the Viterbi algorithm. However, the folding noise, that is, aliasing in the signal transmitted from the transmission apparatus 10 according to the first embodiment is noise generated in the frequency domain, and hence, in the time domain, the aliasing expands to the entire one SC block. Therefore, the interference component may become a level causing no problem. On the other hand, depending on the conditions, the interference component may increase. In this case, the interference-removal and demodulation unit 26 performs the processing of removing the interference component. The processing performed by the interference-removal and demodulation unit 26 will be described below.

First, when the equation (5) described above is expressed by using a vector and a matrix, it becomes as represented by the following equation (8).

[Equation 8]

$$x = Ad' + Bd'' \quad (8)$$

Here, d' and d" are vectors including the transmitted symbol as an element as described in the following equation (9) and equation (10). The symbol in one SC block is divided into d' and d", and the 0th to the $N_D$–1th symbols of N symbols for one SC block are included in d' and the $_{Dth}$ to the N–1th symbols are included in d". According to the present embodiment, the symbols for one SC block are divided into two symbol groups in this manner, and demodulation of one symbol group is performed first and demodulation of the other symbol group is performed led by using a result of the demodulated symbol group. That is, the symbol group to be demodulated is divided into a first symbol group and a second symbol group, and demodulation of the first symbol group is performed and then, demodulation of the second symbol group is performed by using the demodulation result of the second first symbol group. Accordingly, even when there is an interference component, demodulation can be performed. When the symbol is divided into two symbol groups, a boundary is not limited to the boundary between $N_D$–1 and $N_D$, and the boundary can be set anywhere.

[Equation 9]

$$d' = [d_0, d_1, \ldots, d_{N_D-1}]^T \quad (9)$$

[Equation 10]

$$d'' = [d_{N_D}, d_{N_D+1}, \ldots, d_{N-1}]^T \quad (10)$$

Matrixes A and B are matrixes defined by the following equations (11) and (12).

[Equation 11]

$$A = \begin{bmatrix} w_{0,0} & w_{0,1} & \cdots & w_{0,N_D-1} \\ w_{1,1} & w_{1,1} & \cdots & w_{1,N_D-1} \\ \vdots & \vdots & \ddots & \vdots \\ w_{N-1,0} & w_{N-1,1} & \cdots & w_{N-1,N_D-1} \end{bmatrix} \quad (11)$$

[Equation 12]

$$B = \begin{bmatrix} w_{0,N_D} & w_{0,N_D+1} & \cdots & w_{0,N-1} \\ w_{1,N_D} & w_{1,N_D+1} & \cdots & w_{1,N-1} \\ \vdots & \vdots & \ddots & \vdots \\ w_{N-1,N_D} & w_{N-1,N_D+1} & \cdots & w_{N,N-1} \end{bmatrix} \quad (12)$$

The interference-removal and demodulation unit 26 first demodulates d', assuming Bd" as a noise component based on the above equation (8). At this time, any demodulation method can be used. However, for example, it is possible to use a demodulation method described in J. Jalden and B. Ottersten, "On the complexity of sphere decoding in digital communications" IEEE Trans. on Signal Processing, vol.53, No.4, April 2005, pp.1474-1484.

After performing demodulation of d', as described in the following equation (13), the interference-removal and demodulation unit 26 uses the demodulated d' to obtain x' by deleting A$\hat{d}$' from x.

[Equation 13]

$$x' = x - A\hat{d}' \qquad (13)$$

The interference-removal and demodulation unit 26 then performs demodulation of d" by using x' obtained from the above equation (13). That is, the interference-removal and demodulation unit 26 obtains d" by using B and x' so that Bd"=x' is fulfilled. After demodulation of d", the interference-removal and demodulation unit 26 performs demodulation of d' by using x" obtained by subtracting $\hat{d}$"B from x as described in the following equation (14), based on the demodulation result of d". That is, the interference-removal and demodulation unit 26 obtains d' so that x"=Ad' is fulfilled.

[Equation 14]

$$x'' = x - B\hat{d}'' \qquad (14)$$

Figure 13:
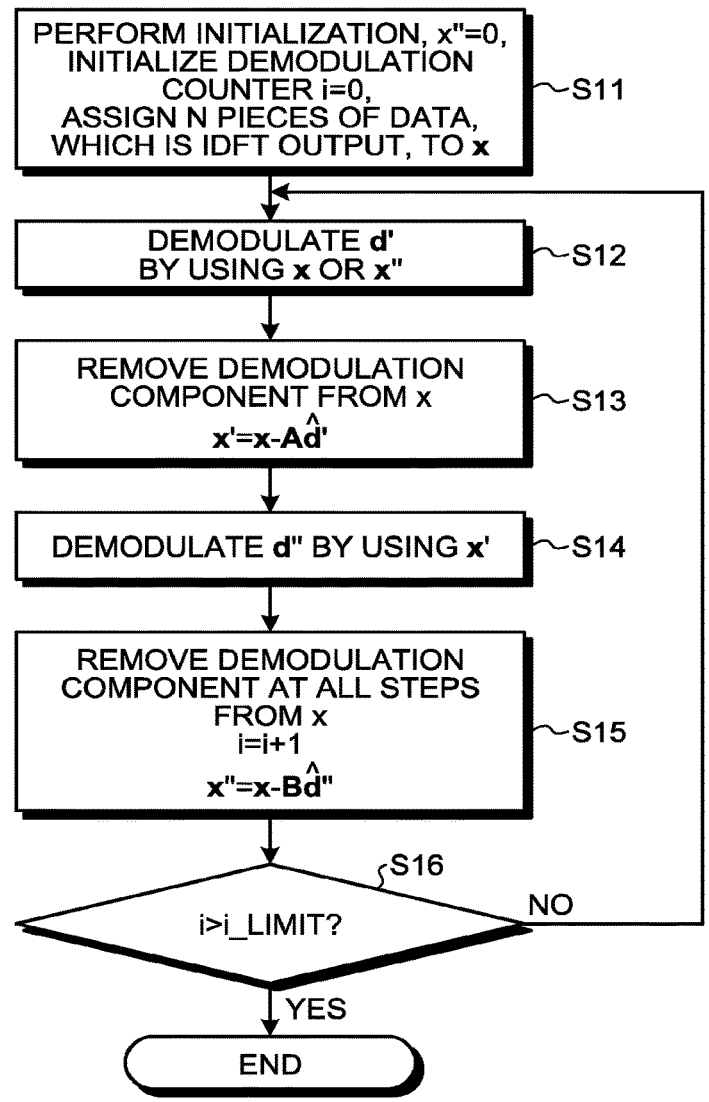
FIG. 13 is a flowchart illustrating an example of an interference-removal and demodulation processing procedure according to the second embodiment.

The interference-removal and demodulation processing described above can be performed by repetitive processing as illustrated in FIG. 13. FIG. 13 is a flowchart illustrating an example of the interference-removal and demodulation processing procedure according to the present embodiment. In the description of FIG. 13, x, d, A, and B in boldface are abbreviated as x, d, A, and B. First, as initialization processing, the interference-removal and demodulation unit 26 sets all the respective elements of x" to 0, and sets i that is a demodulation counter to 0 (Step S11). The interference-removal and demodulation unit 26 assigns the IDFT output signal output from the IDFT unit 28 to elements of x.

The interference-removal and demodulation unit 26 demodulates d' by using x or x" (Step S12). Specifically, if x" has not been calculated yet, that is, when i is 1, the interference-removal and demodulation unit 26 demodulates d' by using x and A regarding Bd" as a noise component in the equation (8). If x" has been already calculated, that is, when i is equal to or larger than 1, the interference-removal and demodulation unit 26 demodulates d' by using x" instead of x and A and regarding Bd" as a noise component in the equation in which x in the equation (8) is replaced by x".

The interference-removal and demodulation unit 26 obtains x' by removing A$\hat{d}$' being a component including the demodulation result, that is, the demodulation component from x by using the demodulation result $\hat{d}$' of d' obtained at Step S12 (Step S13). The interference-removal and demodulation unit 26 then demodulates d" by using x' (Step S14). That is, the interference-removal and demodulation unit 26 obtains d" by using B and x' so that Bd"=x' is fulfilled.

Then, the interference-removal and demodulation unit 26 removes the demodulation component of the demodulation component $\hat{d}$" acquired by demodulation at Step S14, that is, B$\hat{d}$" from x to obtain x" and sets i=i+1 (Step S15). The interference-removal and demodulation unit 26 determines whether i is larger than i_LIMIT that is an integer indicating an upper limit of the number of repetitions (Step S16). If i is larger than i_LIMIT (YES at Step S16), the interference-removal and demodulation unit 26 finishes the processing. If i is equal to or smaller than i_LIMIT (NO at Step S16), the interference-removal and demodulation unit 26 returns to Step S12.

By performing the repetition processing in the manner described above, $\hat{d}$' and $\hat{d}$", that is, the demodulation component of d' and d" can be obtained.

In the present embodiment, the reception apparatus 20 that receives a signal transmitted from the transmission apparatus 10 according to the first embodiment first performs demodulation of one of the symbol groups in the demodulation processing, and then performs demodulation of the other symbol group by using the result of the demodulated symbol group. Accordingly, even when there is a frequency component erased by the band limiting filter 3 in the transmission apparatus 10, demodulation can be performed, while the interference component is removed.

Third Embodiment.

Figure 14:
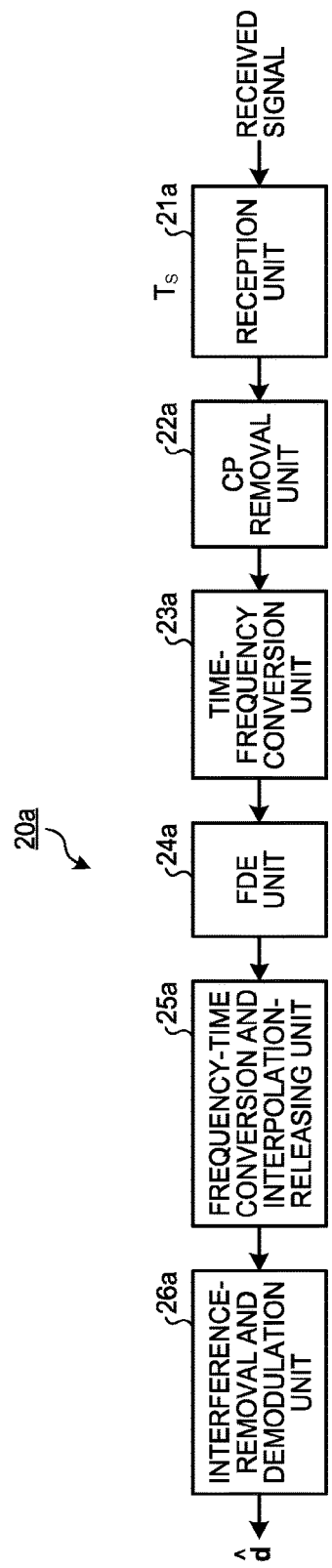
FIG. 14 is a diagram illustrating a configuration example of a reception apparatus according to a third embodiment.

FIG. 14 is a diagram illustrating a configuration example of a reception apparatus 20a according to a third embodiment of the present invention. The reception apparatus 20a according to the present embodiment receives a transmission signal transmitted from the transmission apparatus 10 according to the first embodiment. As illustrated in FIG. 14, the reception apparatus 20a according to the present embodiment includes a reception unit 21a being a receiver that receives a signal and performs sampling of the received signal, a CP removal unit 22a that removes a CP from the sampled received signal, a time-frequency conversion unit 23a that converts the received signal from which a CP has been removed to a frequency domain signal, an FDE unit 24a that performs frequency domain equalization (FDE) by using the frequency domain signal, a frequency-time conversion and interpolation-releasing unit 25a that converts the signal that has undergone filter processing to a time domain signal and releases interpolation, and an interference-removal and demodulation unit 26a that removes an interference component from the signal that has undergone the processing performed by the frequency-time conversion and interpolation-releasing unit 25a and performs demodulation.

Figure 15:
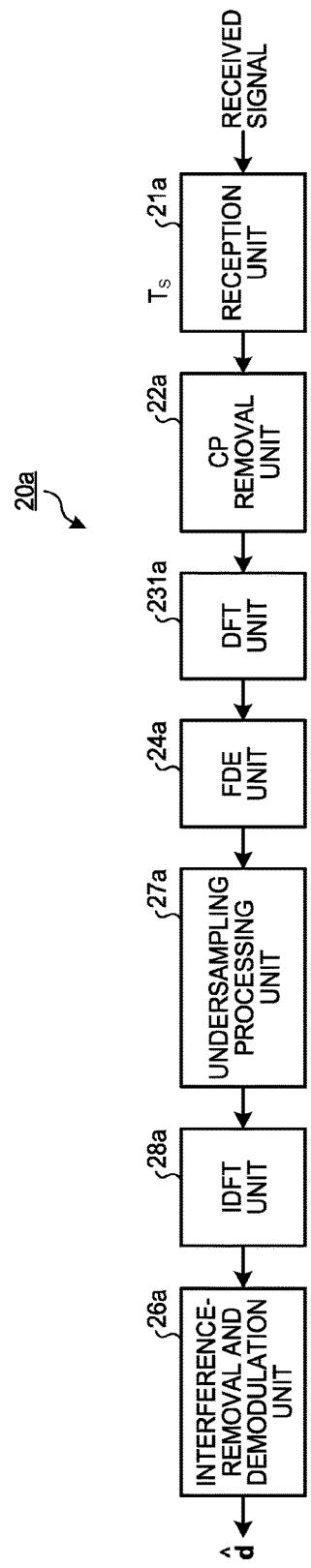
FIG. 15 is a diagram illustrating a configuration example of the reception apparatus according to the third embodiment, when including the DFT unit and the IDFT unit.

The time-frequency conversion unit 23a in FIG. 14 can be realized by a DFT unit, and the frequency-time conversion and interpolation-releasing unit 25a can be realized by an undersampling processing unit and an IDFT unit. FIG. 15 is a diagram illustrating a configuration example of the reception apparatus according to the present embodiment, when a DFT unit and an IDFT unit are included. In the configuration example illustrated in FIG. 15, the time-frequency conversion unit 23a in FIG. 14 is realized by a DFT unit 231a, and the frequency-time conversion and interpolation-releasing unit 25a is realized by an undersampling processing unit 27a and an IDFT unit 28a. In FIG. 15, parts corresponding to constituent elements in FIG. 14 are denoted by like reference signs as those in FIG. 14. Configurations and operations of the present embodiment are explained based on the configuration example illustrated in FIG. 15. While all the constituent elements illustrated in FIG. 15 can be realized by hardware similarly to the reception apparatus 20 in the second embodiment, a part thereof can be realized by software.

The reception apparatus 20 according to the second embodiment performs sampling of the received signal at the sampling interval αTs. The reception apparatus 20a according to the present embodiment performs sampling of the received signal at the sampling interval Ts. Hereinafter, parts that are different from the second embodiment will be described. Operations according to the present embodiment other than operations described below are identical to those of the second embodiment. The configuration of the communication system according to the present embodiment is identical to the communication system illustrated in FIG. 9 of the first embodiment, except that the reception apparatus 20 of the first embodiment 1 is replaced by the reception apparatus 20a.

The reception apparatus 21a performs sampling of the received signal at the sampling interval Ts. Therefore, the number of pieces of data after sampling per one SC block is $L(N_D+N_{CP})$. The CP removal unit 22a erases $LN_{CP}$ pieces of data, which is a CP portion of each SC block, as the CP removal processing.

The DFT unit 231a converts the $LN_{CP}$ pieces of data that have undergone the CP removal processing to a frequency domain signal by $LN_{CP}$-point DFT. The FDE unit 24a performs frequency domain equalization on the frequency domain signal output from the DFT unit 231a. The frequency domain equalization performed by the FDE unit 24a is identical to the processing performed by the FDE unit 24 of the second embodiment, except that the number of points of the data is different.

The undersampling processing unit 27a performs inverse processing to the oversampling processing performed by the oversampling processing unit 41 of the transmission apparatus 10. When the oversampling is performed by zero insertion, the undersampling processing unit 27a erases data in the domain into which zero is inserted by the transmission apparatus 10. Accordingly, the number of pieces of data in one SC block becomes $N_D$.

The IDFT unit 28a converts the data output from the undersampling processing unit 27a to an $N_D$-point time domain signal by $N_D$-point IDFT. The interference-removal and demodulation unit 26a uses the $N_D$-point time domain signal output from the IDFT unit 28a to perform interference removal and demodulation. Specifically, the following processing is performed.

Hereinafter, when it is assumed that there is no noise, the $N_D$-point time domain signal x output from the IDFT unit 28a can be represented by the following equation (15).

[Equation 15]

$$x=Fd \quad (15)$$

F in the above equation (15) is an $N_D \times N$ matrix. When the above equation is to be solved, it can be solved by using a Minimum Norm method as described in J. van de Beek and F. Berggren, "N-continuous OFDM", IEEE Trans. on Commun., vol. 13, no.1, January 2009, pp.1-3. An example of a method of demodulating d by the Minimum Norm method is described in the following equation (16).

[Equation 16]

$$\hat{d}=F^H(FF^H)^{-1}x \quad (16)$$

Other than using the above equation (16), as in the second embodiment, the symbol can be divided into two symbol groups as described below. The above equation (15) can be represented by the following equation (17), as in the equation (8) of the second embodiment.

[Equation 17]

$$x=Cd'+Dd'' \quad (17)$$

C and D in the above equation (17) are matrixes defined by the following equations (18) and (19).

[Equation 18]

$$C = \begin{bmatrix} f_{0,0} & f_{0,1} & \cdots & f_{0,N_D-1} \\ f_{1,1} & f_{1,1} & \cdots & f_{1,N_D-1} \\ \vdots & \vdots & \ddots & \vdots \\ f_{N_D-1,0} & f_{N_D-1,1} & \cdots & f_{N_D-1,N_D-1} \end{bmatrix} \quad (18)$$

[Equation 19]

$$D = \begin{bmatrix} f_{0,N_D} & f_{0,N_D+1} & \cdots & f_{0,N-1} \\ f_{1,N_D} & f_{1,N_D+1} & \cdots & f_{1,N-1} \\ \vdots & \vdots & \ddots & \vdots \\ f_{N_D-1,N_D} & f_{N_D-1,N_D+1} & \cdots & f_{N_D-1,N-1} \end{bmatrix} \quad (19)$$

F can be expressed as a matrix [CD] in which C and D are arranged horizontally.

The interference-removal and demodulation unit 26a of the present embodiment uses the above equation (17) to divide the symbol for one SC block into two symbol groups, as in the second embodiment, and performs demodulation of one symbol group first and then performs demodulation of the other symbol group by using the result of the demodulated symbol group. Accordingly, even when there is an interference component, demodulation can be performed.

That is, the interference-removal and demodulation unit 26a uses x, and regards Dd'' as a noise component, to perform demodulation of d'. After demodulation of d', the interference-removal and demodulation unit 26a erases the demodulation component of d' from x as described in the following equation (20).

[Equation 20]

$$x'=x-C\hat{d}' \quad (20)$$

The interference-removal and demodulation unit 26a uses x' to perform demodulation of d''. After demodulation of d'', the interference-removal and demodulation unit 26a subtracts the demodulation component of d'' from the above equation (17) to obtain x'' described in the following equation (21). The interference-removal and demodulation unit 26a uses x'' to perform demodulation of d'.

[Equation 21]

$$x''=x-D\hat{d}'' \quad (21)$$

Figure 16:
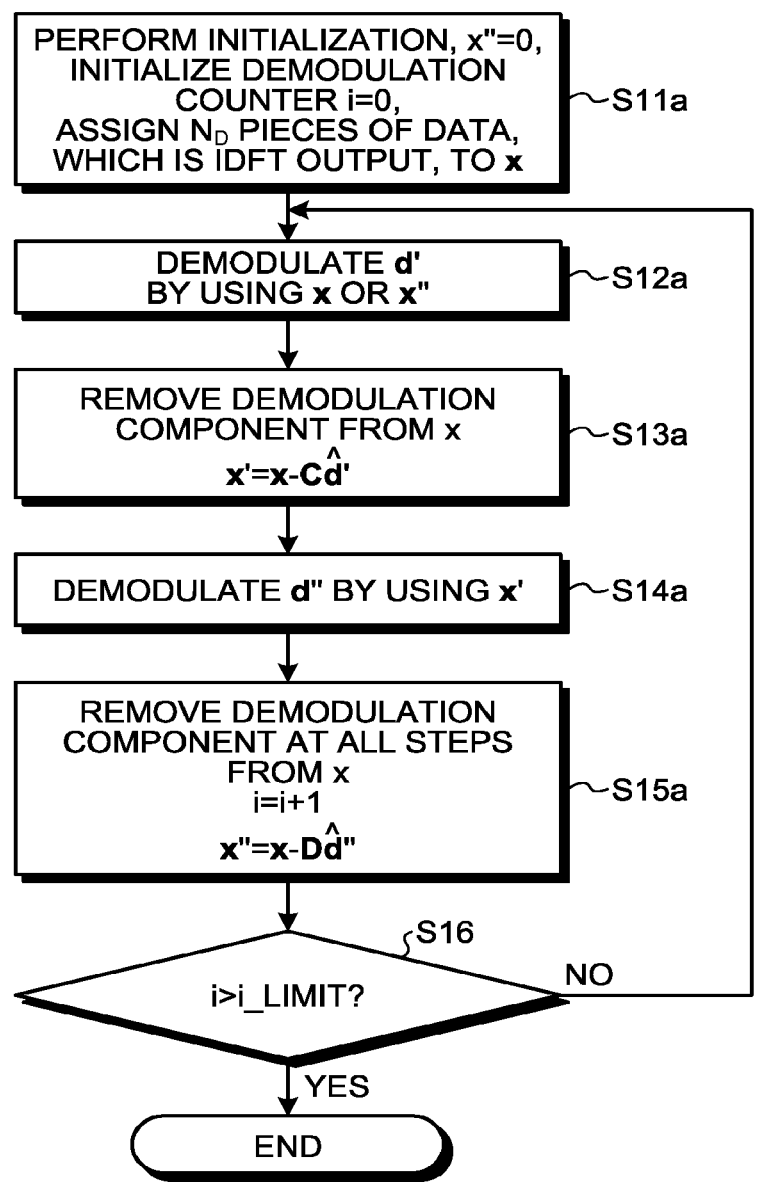
FIG. 16 is a flowchart illustrating an example of an interference-removal and demodulation processing procedure according to the third embodiment.

The interference-removal and demodulation processing described above can be performed by repetitive processing as illustrated in FIG. 16. FIG. 16 is a flowchart illustrating an example of the interference-removal and demodulation processing procedure according to the present embodiment. In the description of FIG. 16, x, d, C, and D in boldface are abbreviated as x, d, C, and D. First, as initialization processing, the interference-removal and demodulation unit 26a sets all the elements of x'' to 0, and sets i being a demodulation counter to 0 (Step S11a). The interference-removal and demodulation unit 26a assigns the $N_D$ IDFT output signals output from the IDFT unit 28a to elements of x.

The interference-removal and demodulation unit 26a then demodulates d' by using x or x'' (Step S12a). Specifically, when x' x'' has not been calculated yet, that is, when i is 1, the interference-removal and demodulation unit 26a demodulates d' by using x and C and regarding Dd'' as a noise component in the equation (17). When x'' has been already calculated, that is, when i is equal to or larger than 1, the interference-removal and demodulation unit 26a demodulates d' by using x'' instead of x and C and regarding Dd'' as a noise component in the equation in which x in the equation (17) is replaced by The interference-removal and demodulation unit 26a obtains x' by removing C' being a component including the de modulation result, that is, the demodulation component from x by using the demodulation result ' of d' obtained at Step S12a(Step S13a). The interference-removal and demodulation unit 26a then demodulates d'' by using x' (Step S14a). That is, the interference-removal and demodulation unit 26a obtains d'' by using D and x' so that Dd''=x' is fulfilled. The ' in the equation (20) can be obtained as represented by the following equation (22).

[Equation 22]

$$\hat{d}'=(C^HC)^{-1}C^Hx,$$

$$\hat{d}'=(C^HC)^{-1}C^Hx'' \quad (22)$$

Similarly, $\hat{d}''$ can be obtained as represented by the following equation (23).

[Equation 23]

$$\hat{d}''=(D^HD)^{-1}D^Hx' \quad (23)$$

The interference-removal and demodulation unit 26a obtains x" by removing a demodulation component of the demodulation component $\hat{d}''$, that is, $D\hat{d}''$ acquired by demodulation at Step S14a described above, from x to obtain x", and sets i=i+1 (Step S15a). Step S16 is identical to Step S16 of the second embodiment, and when i is equal to or smaller than i_LIMIT, the process returns to Step S12a.

In the present embodiment, the reception apparatus 20a that receives a signal transmitted from the transmission apparatus 10 according to the first embodiment performs sampling at the sampling interval Ts in demodulation processing, and as in the second embodiment, performs demodulation of one of the symbol groups first, and then performs demodulation of the other symbol group by using the result of the demodulated symbol group. Accordingly, even when there is a frequency component erased by the band limiting filter 3 in the transmission apparatus 10, demodulation can be performed, while removing the interference component.

Fourth Embodiment.

Figure 17:
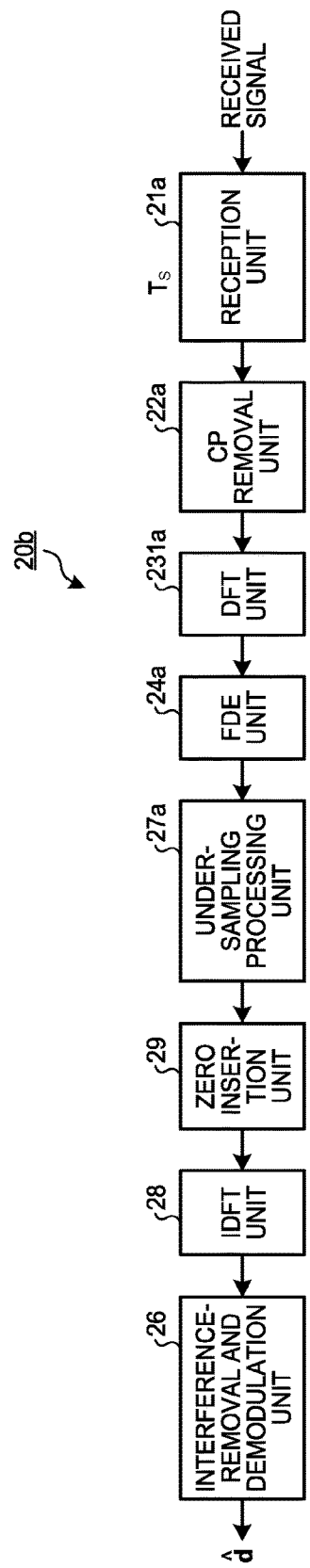
FIG. 17 is a diagram illustrating a configuration example of a reception apparatus according to a fourth embodiment.

FIG. 17 is a diagram illustrating a configuration example of a reception apparatus 20b according to a fourth embodiment of the present invention. The reception apparatus 20b according to the present embodiment receives a transmission signal transmitted from the transmission apparatus 10 according to the first embodiment. As illustrated in FIG. 17, the reception apparatus 20b according to the present embodiment includes the reception unit 21a, the CP removal unit 22a, the DFT unit 231a, the FDE unit 24a, and the undersampling processing unit 27a as in the third embodiment, and the IDFT unit 28 and the interference-removal and demodulation unit 26 as in the first embodiment. The reception apparatus 20b also includes a zero insertion unit 29. Constituent elements having identical functions as those in the first embodiment or the second embodiment are denoted by like reference signs as those in the first embodiment or the second embodiment and redundant explanations will be omitted. Different points from the first embodiment or the second embodiment are explained below. While the zero insertion unit 29 is a zero insertion circuit, it can also be realized by software.

Similarly to the third embodiment, the reception apparatus 20b according to the present embodiment performs sampling at the sampling interval Ts. The processing performed by the CP removal unit 22a, the DFT unit 231a, the FDE unit 24a, and the undersampling processing unit 27a are identical to those of the third embodiment. The number of pieces of data that have undergone the undersampling processing by the undersampling processing unit 27a is $N_D$ as in the second embodiment. The zero insertion unit 29 inserts zero by $N_D/2$ each on the both sides of $N_D$. That is, the zero insertion unit 29 inserts data having a value 0 into the frequency domain adjacent to the bandwidth to generate a frequency domain signal having a bandwidth before the band limitation in the transmission apparatus 10. FIG. 18 is a diagram illustrating an example of zero insertion processing performed by the zero insertion unit 29 according to the present embodiment. Accordingly, the number of pieces of data that have undergone zero insertion by the zero insertion unit 29 becomes N. The number of zeros to be inserted need not be symmetrical. The number of pieces of data to be input to the IDFT unit 28 similar to that in the second embodiment becomes N by the processing, and the IDFT unit 28 performs N-point IDFT. The operations of the IDFT unit 28 and the interference-removal and demodulation unit 26 are identical to those in the second embodiment. The interference-removal and demodulation unit 26 can perform interference removal and demodulation as in the second embodiment.

An example of performing encoding and decoding of an error correction code in the transmission apparatus and the reception apparatus described in the above-described embodiments is described next as a modification. In a transmission apparatus that performs encoding of an error correction code, the symbol generation unit 1 of the transmission apparatus 10 according to the first embodiment is changed to a symbol generation unit 1a illustrated in FIG. 19, and the transmission apparatus performs error correction encoding processing. FIG. 19 is a diagram illustrating a configuration example of the symbol generation unit 1a to be used in the transmission apparatus that performs encoding of an error correction code. As illustrated in FIG. 19, the symbol generation unit 1a includes an error correction encoding unit 11, which is an encoder that performs the error correction encoding processing, and a modulation unit 12, which is a modulator that modulates data that has undergone the error correction encoding processing. The transmission apparatus that performs encoding of an error correction code is identical to the transmission apparatus 10 according to the first embodiment, except that the symbol generation unit 1 is replaced by the symbol generation unit 1a.

Figure 20:
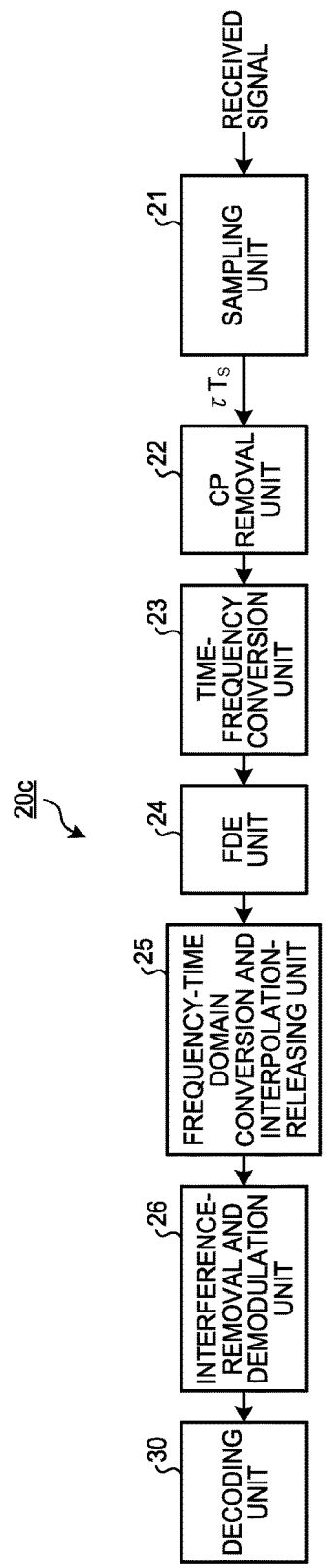
FIG. 20 is a diagram illustrating a configuration example of a reception apparatus that performs decoding.

When the transmission apparatus performs the error correction encoding processing, the reception apparatus includes a decoding unit that performs error correction decoding. FIG. 20 is a diagram illustrating a configuration example of a reception apparatus 20c that performs decoding. The reception apparatus 20c is identical to the reception apparatus 20 according to the second embodiment, except that a decoding unit 30 being a decoder that performs error correction decoding processing is added to the reception apparatus 20 according to the second embodiment. A sampling unit 21 in FIG. 20 is identical to the reception unit 21 in FIG. 10. The decoding unit 30 decodes data that has undergone interference removal and demodulation performed by the interference-removal and demodulation unit 26. At this time, the decoding unit 30 performs error correction decoding on the data that has undergone interference removal and demodulation. The decoding unit can be added to the reception apparatus according to the third or fourth embodiment.

The configurations described in the above embodiments are only an example of the content of the present invention. The configurations can be combined with other well-known techniques, and a part the configuration can be omitted or modified without departing from the scope of the present invention.

REFERENCE SIGNS LIST 1, 1a symbol generation unit, 2 time-frequency conversion unit, 3 band limiting filter, 4 interpolation-processing and frequency-time conversion unit, 5 CP insertion unit, 6 transmission unit, 7, 231, 231a DFT unit, 10 transmission apparatus, 20, 20a, 20b, 20c reception apparatus, 21, 21a reception unit, 22, 22a CP removal unit, 23, 23a time-frequency conversion unit, 24, 24a FDE unit, 25, 25a frequency-time conversion and interpolation-releasing unit, 26, 26a interference-removal and demodulation unit, 27, 27a undersampling processing unit, 28, 28a, 42 IDFT unit, 29 zero insertion unit, 30 decoding unit, 41 oversampling processing unit, 300 communication system.

The invention claimed is:

1. A reception apparatus to receive a transmitted signal, which is obtained by converting a transmission signal including N (N is an integer equal to or larger than 2) symbols to a frequency domain signal having a first bandwidth, performing band limitation on the transmission signal converted to the frequency domain signal to obtain a frequency domain signal having a second bandwidth narrower than the first bandwidth, and converting the band-limited transmission signal to a time domain signal, the transmission signal converted to the time domain signal being transmitted at a set transmission interval, wherein the reception apparatus comprising:
   a receiver to perform sampling of a received signal, which is obtained by receiving the transmitted signal;
   a time-frequency converter to convert the sampled received signal to a frequency domain signal;
   an equalizer to perform frequency domain equalization processing based on the received signal converted to the frequency domain signal;
   a frequency-time converter to convert the received signal that has undergone the frequency-domain equalization processing to a time domain signal; and
   a demodulator to perform interference removal processing and demodulation based on the received signal converted to the time domain signal, repeatedly for a preset number of times,
   wherein the receiver sets a sampling interval for sampling the received signal to a value obtained by multiplying the transmission interval by a value obtained by dividing the second bandwidth by the first bandwidth.

2. A reception apparatus to receive a transmitted signal, which is obtained by converting a transmission signal including N (N is an integer equal to or larger than 2) symbols to a frequency domain signal having a first bandwidth, performing band limitation on the transmission signal converted to the frequency domain signal to obtain a frequency domain signal having a second bandwidth narrower than the first bandwidth, and converting the band-limited transmission signal to a time domain signal, the transmission signal converted to the time domain signal being transmitted at a set transmission interval, wherein the reception apparatus comprising:
   a receiver to perform sampling of a received signal, which is obtained by receiving the transmitted signal;
   a time-frequency converter to convert the sampled received signal to a frequency domain signal;
   an equalizer to perform frequency domain equalization processing based on the received signal converted to the frequency domain signal;
   a frequency-time converter to convert the received signal that has undergone the frequency-domain equalization processing to a time domain signal; and
   a demodulator to perform interference removal processing and demodulation based on the received signal converted to the time domain signal, repeatedly for a preset number of times,
   wherein the demodulator divides a symbol group to be demodulated into a first symbol group and a second symbol group each of the first and the second symbol groups being sequential, performs demodulation of the first symbol group, and performs demodulation of the second symbol group by using a demodulation result of the first symbol group.

3. The reception apparatus according to claim 2, wherein the demodulator further performs demodulation of the first symbol group by using a demodulation result of the second symbol group.

* * * * *